(12) United States Patent
Van Rensburg et al.

(10) Patent No.: US 7,762,019 B2
(45) Date of Patent: Jul. 27, 2010

(54) PLANT PROTECTIVE COVER

(75) Inventors: Leon Van Rensburg, Potchefstroom (ZA); Tjaart Andries Du Plessis, Pretoria (ZA); Horst Seute, Pretoria (ZA)

(73) Assignee: North-West University, Potchestroom (ZA)

( * ) Notice: Subject to any disclaimer, the term of this patent is extended or adjusted under 35 U.S.C. 154(b) by 1044 days.

(21) Appl. No.: 10/548,104

(22) PCT Filed: Mar. 4, 2004

(86) PCT No.: PCT/IB2004/050199

§ 371 (c)(1),
(2), (4) Date: Jun. 14, 2006

(87) PCT Pub. No.: WO2004/077935

PCT Pub. Date: Sep. 16, 2004

(65) Prior Publication Data

US 2006/0254136 A1    Nov. 16, 2006

(30) Foreign Application Priority Data

Mar. 6, 2003    (ZA) .................................. 2002/9627

(51) Int. Cl.
*A01G 13/02* (2006.01)
(52) U.S. Cl. ........................................... 47/29.1
(58) Field of Classification Search ............... 47/29.1, 47/9, 17, 20.1, 29.2, 29.4
See application file for complete search history.

(56) References Cited

U.S. PATENT DOCUMENTS

| 4,134,875 A | 1/1979 | Tapia |
| 4,423,164 A | 12/1983 | Bar |
| 4,559,381 A | 12/1985 | Tapia et al. |
| 4,895,904 A | 1/1990 | Allingham |
| 5,767,179 A | 6/1998 | Takado |
| 2004/0030009 A1* | 2/2004 | Gugumus .................... 524/86 |

FOREIGN PATENT DOCUMENTS

| EP | 0 761 427 A1 | 3/1997 |
| EP | 1 178 078 A1 | 2/2002 |
| EP | 1 342 748 A1 | 9/2003 |
| GB | 2 057 454 A | 4/1981 |

* cited by examiner

*Primary Examiner*—Michael R Mansen
*Assistant Examiner*—Monica Williams
(74) *Attorney, Agent, or Firm*—Finnegan, Henderson, Farabow, Garrett, & Dunner, L.L.P.

(57) ABSTRACT

This invention relates to a plant protective cover of a translucent polymeric material including at least one transmission spectrum modifier for minimizing the transmission in the ultraviolet range up to 350 nm; and for adjusting the transmission in the visible light range between 350 nm and 750 nm in accordance with photosynthetic and photomorphogenic requirements of plants to be cultivated underneath the plant protective cover, to enhance the growth conditions of such plants. The cover further includes a transmission spectrum modifier for minimizing the transmission in the infrared range above 750 nm. The transmission in the visible light range between 350 nm and 750 nm is adjusted by decreasing the transmitted green and yellow wavelengths and by changing the ratio of blue to red wavelengths transmitted towards a 2:3 ratio. The cover optimises growing conditions for plants cultivated underneath the cover thus providing relatively enhanced plant growth and performance.

14 Claims, 3 Drawing Sheets

PRIOR ART

FIGURE 3

PRIOR ART

PLANT PROTECTIVE COVER

This application is a National Phase based on PCT/IB2004/050199, filed Mar. 4, 2004, the contents of which are incorporated herein by reference and claims the benefit of South African Application No. 2002/9627, filed on Mar. 6, 2003, the contents of which are incorporated herein by reference.

INTRODUCTION

This invention relates to a plant protective cover, a method of manufacturing a plant protective cover, plants cultivated using the plant protective cover and a method of cultivating plants using such plant protective cover.

BACKGROUND TO THE INVENTION

Known commercially available plant protective covers comprise transparent or opaque thermoplastic flexible films or rigid sheets used for covering plants to protect them from environmental factors such as extreme temperatures, harmful insects, dust, infrared (IR) radiation and ultraviolet (UV) radiation.

For example, U.S. Pat. No. 4,895,904 discloses polymer sheets or films for use in the construction of greenhouses. The polymer sheets or films contain additives, which absorb or reflect light in the near IR region, as well as additives for the stabilisation of UV radiation. These sheets are essentially transparent to the photosynthetic active region of the light spectrum.

Further for example, JP 7067 479 discloses a material for enhancing plant growth by manipulating the transmitted light spectrum. The material incorporates additives for screening IR, transmitting visible light and only partially transmitting UV.

Other known plant covers are sold under the Smartlight™ and Sun Selector™ trade marks. Photosynthesis strongly depends on the total amount of light that plants receive in the photosynthetic active region with major contributions from blue and red light. The Smartlight™ cover is a photo-selective plant cover that converts part of the UV light to red light, whilst also limiting the transmission of light on the longer end of the wavelength spectrum.

The Sun Selector™ film is a multi-layer photo selective film for use in the construction of greenhouses and tunnel coverings. The Sun Selector™ film contains IR additives to enable the film to absorb or reflect IR radiation. This film is further stabilised against UV radiation. Maximum light is transmitted in the visible range between 400 nm and 700 nm.

The known plant protective covers are primarily aimed at protecting a plant, cultivated underneath the cover, from environmental variables. These covers allow non-selective maximum transmission in the visible light range of the spectrum (400 nm-750 nm). However, they do not provide optimal transmittance spectra in the photosynthetic active region or cater for the specific photosynthetic and photomorphogenic needs of different varieties of plants. This is a disadvantage since different plant varieties respond to different photosynthetic and photomorphogenically active wavelengths of light and the known plant covers do not discriminate selectively between the said different wavelengths nor do they provide optimal transmittance spectra, which favours most plant varieties. The positive effect of the prior art covers on plants is therefore limited.

OBJECT OF THE INVENTION

It is therefore an object of the present invention to provide a plant protective cover, a method of manufacturing a plant protective cover, plants cultivated using the plant protective cover and a method of cultivating plants using such plant protective cover with which the aforesaid disadvantage can be overcome or at least minimised.

SUMMARY OF THE INVENTION

According to a first aspect of the invention there is provided a plant protective cover of a translucent polymeric material including at least one transmission spectrum modifier for minimising the transmission in the ultraviolet range up to 350 nm; and for adjusting the transmission in the visible light range between 350 nm and 750 nm in accordance with photosynthetic and photomorphogenic requirements of plants to be cultivated underneath the plant protective cover, to enhance the growth conditions of such plants.

Further according to the invention the plant protective cover includes a transmission spectrum modifier for minimising the transmission in the infrared range above 750 nm.

Yet further according to the invention the transmission in the visible light range between 350 nm and 750 nm is adjusted by decreasing the transmitted green and yellow wavelengths.

Even further according to the invention the transmission in the visible light range between 350 nm and 750 nm is adjusted by changing the ratio of blue to red wavelengths transmitted towards a 2:3 ratio.

The transmission spectrum modifier may be selected from the group consisting of silicates, sodium metaphosphates, alunite, aluminium hydroxide, boron hydroxides, magnesium oxide, copper oxide, black iron oxide, cobalt oxide, coated copper powder, blue cobalt oxide, UV radiation stabilisers, and pigments.

The plant protective cover may include additional additives selected from the group consisting of antioxidants, processing aids, anti-dust, and anti-fog agents.

The plant protective cover may include between 0.1 and 2.0% of a benzotriazole UV absorber on a mass per mass basis.

Preferably the plant protective cover includes 0.7% on a mass per mass basis of the benzotriazole UV absorber in the form of 2-(2-hydroxy-3-sec-butyl-5-t-butylphenyl)benzotriazole.

The plant protective cover may include between 0.1 and 2.0% of a hindered amine light stabiliser on a mass per mass basis.

Preferably the plant protective cover includes 0.3% on a mass per mass basis of the hindered amine light stabiliser in the form of dimethyl succinate .w/4-hydroxy-2,2,6,6-tetramethyl-1piperidine ethanol.

Alternatively, the plant protective cover may include 0.3% on a mass per mass basis of the hindered amine light stabiliser in the form of poly((6-((1,1,3,3-tetramethylbutyl)amino)-s-triazine-2,4dijil)(2,2,6.6-tetramethyl-4-piperidyl)imino) hexamethylene(2,2,6,6-tetramethyl-4-piperidyl)imino))).

The plant protective cover may include between 0.1 and 2.0% of a phosphite antioxidant on a mass per mass basis.

Preferably the plant protective cover includes 0.4% on a mass per mass basis of the phosphite antioxidant in the form of tris(2,4-di-t-butylphenyl)phosphite.

The plant protective cover may include between 0.1 and 2.0% of a phenolic antioxidant on a mass per mass basis.

Preferably, the plant protective cover includes 0.2% on a mass per mass basis of the phenolic antioxidant stabiliser in the form of 1,3,5-trimethyl-2,4,6-tris(3,5-ditert-butyl-4-hydroxybenzyl)benzene.

The plant protective cover may include between 0.1 and 2.0% of a hindered phenolic antioxidant on a mass per mass basis.

Preferably, the plant protective cover includes 0.2% on a mass per mass basis of the hindered phenolic antioxidant In the form of tetrakismethylene(3,5-di-t-butyl-4-hydroxyhydrocinnamate)methane.

The plant protective cover may include between 0.05 and 2.0% of a spectrum modifier on a mass per mass basis.

Preferably the plant protective cover includes 0.1% on a mass per mass basis of the spectrum modifier in the form of chromophtal red BRN.

The plant protective cover may include between 1.0 and 3.0% of an IR absorber on a mass per mass basis.

Preferably the plant protective cover includes 2.0% on a mass per mass basis of the IR absorber in the form of calcium carbonate (52%), magnesium carbonate (42%), silica (5%) and aluminium hydroxide.

Further according to the invention the polymeric material is a partially cross-linked polymeric thermoplastic material.

Preferably the partially cross-linked polymeric thermoplastic material is made by subjecting a polymeric thermoplastic starting material, which is capable of being cross-linked by ionising irradiation, to sufficient ionising radiation to cross-link the starting material partially.

The plant protective cover may include up to 95% on a mass per mass basis of a radiation pre-crosslinked linear low-density polyethylene having a melt flow index (MFI) from 0.40 to 0.50.

The cover may be produced in a form selected from the group consisting of a mono film, a multi-layer laminate film, a rigid sheet, and a woven or knitted net.

In the case where the cover is in the form of a mono film or a multi-layered film, the polymeric material may be selected from the group consisting of polyethylenes and co-polymers of polyethylene, such as poly(ethylene-co-ethyl vinyl acetate), and polyvinyl chloride (PVC).

In the case where the cover is in the form of a rigid sheet, the polymeric material may be selected from the group consisting of polyethylene, polyvinyl chloride (PVC), polycarbonate (PC), polyethylene terephtalate (PET), and glass reinforced polyesters (GRP).

In the case where the cover is in the form of a woven or knitted net, the polymeric material may be selected from the group consisting of fibrous polyethylenes, polyamides, and polyesters.

According to a second aspect of the invention there is provided a method of manufacturing a plant protective cover including the steps of providing a translucent polymeric material; and incorporating in the material at least one transmission spectrum modifier for minimising the transmission in the ultraviolet range up to 350 nm; and for adjusting the transmission in the visible light range between 350 nm and 750 nm in accordance with photosynthetic and photomorphogenic requirements of plants to be cultivated underneath the plant protective cover, to enhance the growth conditions of such plants.

Further according to the invention the method includes the further step of incorporating in the cover a transmission spectrum modifier for minimising the transmission in the infrared range above 750 nm.

Yet further according to the invention the transmission in the visible light range between 350 nm and 750 nm is adjusted by decreasing the transmitted green and yellow wavelengths.

Even further according to the invention the transmission in the visible light range between 350 nm and 750 nm is adjusted by changing the ratio of blue to red wavelengths transmitted towards a 2:3 ratio.

The step of incorporating transmission spectrum modifiers may yet further include the step of selecting the transmission spectrum modifiers from the group consisting of silicates, sodium metaphosphates, alunite, aluminium hydroxide, boron hydroxides, magnesium oxide, copper oxide, black iron oxide, cobalt oxide, coated copper powder, blue cobalt oxide UV radiation stabilisers, and pigments.

The method may include the further step of incorporating in the cover additional additives selected from the group consisting of antioxidants, processing aids, anti-dust, and anti-fog agents.

The method may include the step of incorporating in the cover between 0.1 and 2.0% of a benzotriazole UV absorber on a mass per mass basis.

Preferably the method includes the step of incorporating in the cover 0.7% on a mass per mass basis of the benzotriazole UV absorber in the form of 2-(2-hydroxy-3-sec-butyl-5-t-butylphenyl)benzotriazole.

The method may include the step of incorporating in the cover between 0.1 and 2.0% of a hindered amine light stabiliser on a mass per mass basis.

Preferably the method includes the step of incorporating in the cover 0.3% on a mass per mass basis of the hindered amine light stabiliser in the form of dimethyl succinate .w/4-hydroxy-2,2,6,6-tetramethyl-1piperidine ethanol.

Alternatively, the method may include the step of incorporating in the cover 0.3% on a mass per mass basis of the hindered amine light stabiliser in the form of poly((6-((1,1,3,3-tetramethylbutyl)amino)-s-triazine-2,4dijil)(2,2,6.6-tetramethyl-4-piperidyl)imino)hexamethylene(2,2,6,6-tetramethyl-4-piperidyl) imino))).

The method may include the step of incorporating in the cover between 0.1 and 2.0% of a phosphite antioxidant on a mass per mass basis.

Preferably the method includes the step of incorporating in the cover 0.4% on a mass per mass basis of the phosphite antioxidant in the form of tris(2,4-di-t-butylphenyl)phosphite.

The method may include the step of incorporating in the cover between 0.1 and 2.0% of a phenolic antioxidant on a mass per mass basis.

Preferably the method includes the step of incorporating in the cover 0.2% on a mass per mass basis of the phenolic antioxidant stabiliser in the form of 1,3,5-trimethyl-2,4,6-tris(3,5-ditert-butyl-4-hydroxybenzyl)benzene.

The method may include the step of incorporating in the cover between 0.1 and 2.0% of a hindered phenolic antioxidant on a mass per mass basis.

Preferably the method includes the step of incorporating in the cover 0.2% on a mass per mass basis of the hindered phenolic antioxidant in the form of tetrakismethylene(3,5-di-t-butyl-4-hydroxyhydrocinnamate)methane.

The method may include the step of incorporating in the cover between 0.05 and 2.0% of a spectrum modifier on a mass per mass basis.

Preferably the method may include the step of incorporating in the cover 0.1% on a mass per mass basis of the spectrum modifier in the form of chromophtal red BRN.

The method may include the step of incorporating in the cover between 1.0 and 3.0% of an IR absorber on a mass per mass basis.

Preferably the method includes the step of incorporating in the cover 2.0% on a mass per mass basis of the IR absorber in the form of calcium carbonate (52%), magnesium carbonate (42%), silica (5%) and aluminium hydroxide.

Further according to the invention the polymeric material is a partially cross-linked polymeric thermoplastic material.

The partially cross-linked polymeric thermoplastic material may be made by subjecting a polymeric thermoplastic starting material, which is capable of being cross-linked by ionising irradiation, to sufficient ionising radiation to cross-link the starting material partially.

The method may include the step of incorporating in the cover up to 95% on a mass per mass basis of a radiation pre-crosslinked linear low-density polyethylene having a melt flow index (MFI) from 0.40 to 0.50.

The additional additives and transmission spectrum modifiers may be incorporated in one or more films extruded in a form selected from the group consisting of a mono film, a multi-layer laminate film, a rigid sheet, and a woven or knitted net.

In the case where the cover is in the form of a mono film or a multi-layered film, the polymeric material may be selected from the group consisting of polyethylenes and co-polymers of polyethylene, such as poly(ethylene-co-ethyl vinyl acetate), and polyvinyl chloride (PVC).

In the case where the cover is in the form of a rigid sheet, the polymeric material may be selected from the group consisting of polyethylene, polyvinyl chloride (PVC), polycarbonate (PC), polyethylene terephthalate (PET), and glass reinforced polyesters (GRP).

Where the cover is in the form of a woven or knitted net, the polymeric material may be selected from the group consisting of fibrous polyethylenes, polyamides, and polyesters.

According to a third aspect of the invention there is provided a method of cultivating plants including the step of covering the plants with a plant protective cover of the first aspect of the invention.

According to a fourth aspect of the invention there is provided plants cultivated using the plant protective cover of the first aspect of the invention.

BRIEF DESCRIPTION OF THE DRAWINGS

The invention will now be described further by way of non-limiting examples with reference to the accompanying drawings wherein.

DESCRIPTION OF PREFERRED EMBODIMENTS OF THE INVENTION

Preferred embodiments of the invention will now be described by way of the following non-limiting examples.

Figure 1:
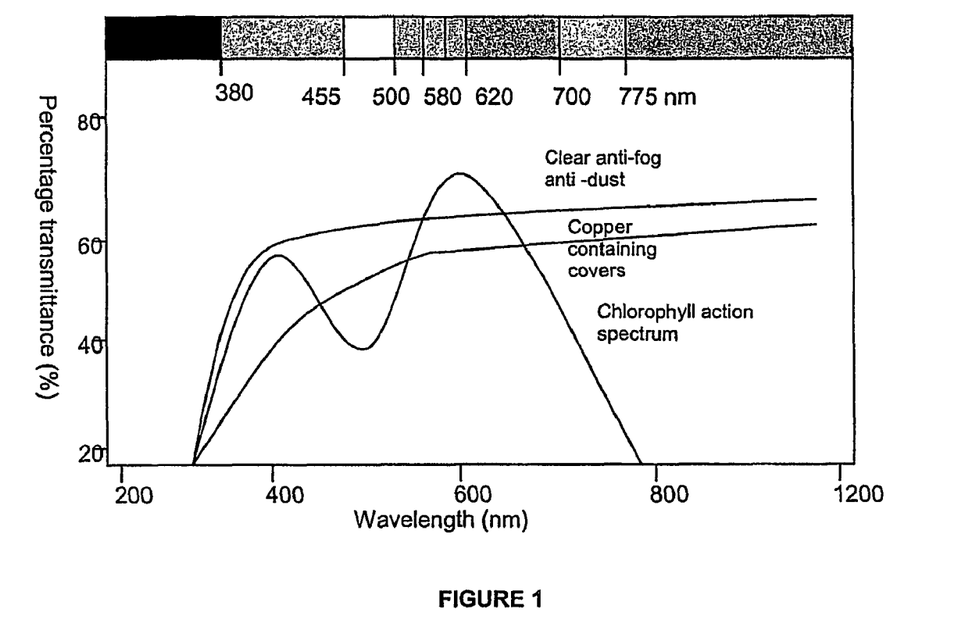
FIG. 1 is a graph depicting a typical transmittance spectrum of the photosynthetic active region of plants in general in comparison with that of two known polyethylene plant protective covers, namely a clear anti-fog anti-dust cover and a copper containing cover.
Figure 2:
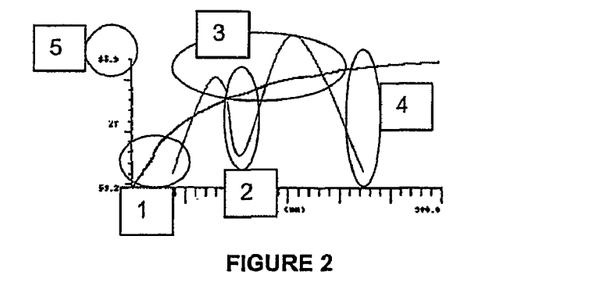
FIG. 2 is a graph depicting the selected transmittance spectrum of a theoretical ideal plant protective cover postulated by the applicant for optimising the photosynthetic characteristics of the light as well as modifying the non-desirable ultraviolet and infrared regions of the spectrum.

Shown in FIG. 1 is a graph depicting a transmittance spectrum of the photosynthetic active region of the light transmission spectrum and which would be ideal for optimal plant yield. This graph is compared with two typical transmittance spectra of known polyethylene plant protective covers, namely a clear anti-fog anti-dust cover and a copper containing cover. The graph shown in FIG. 2 depicts the light transmittance spectrum of a theoretical ideal plant protective cover postulated by the applicant. Two peaks in the photosynthetic region minimises the transmittance of green and yellow wavelengths between the peaks at the red and the blue wavelengths. The red wavelength is the higher peak while the blue wavelength is the lower peak.

A plant protective cover according to a preferred embodiment of the invention is generally manufactured by the extrusion film blowing, as is known in the art of plastic film manufacture, of a translucent polymeric starting material such as radiation pre-crosslinked linear low-density polyethylene (LLDPE). The starting material is modified prior to film blowing by the inclusion of transmission spectrum modifiers and additives, so as to select the transmission spectrum in accordance with particular photosynthetic and photomorphogenic requirements of plants to be cultivated underneath the plant protective cover. The transmission spectrum of the plant protective cover is also selected to minimise the transmission of the UV and IR portions of the spectrum. Hitherto only some aspects of the transmittance spectrum have been modified in the prior art covers in an attempt to improve the growth conditions of plants, whereas the cover of the present invention optimises the transmittance spectrum in accordance with the photosynthetic and photomorphogenic requirements of plants in general. It will be appreciated that the photosynthetic and photomorphogenic requirements of different plant varieties may differ slightly from each other and the applicant foresees that through experimentation a profile could be prepared of the requirements of a particular plant variety, and the transmittance spectrum of the cover be further refined accordingly within the current parameters of the cover.

Example 1

Initially, the applicant compared the light transmission spectra of prior art plant protective covers made from polyethylene and plant protective covers having a selected light transmission spectrum, with film in accordance with the invention, also made from polyethylene. The results are depicted in FIGS. 3 to 5.

Figure 3:
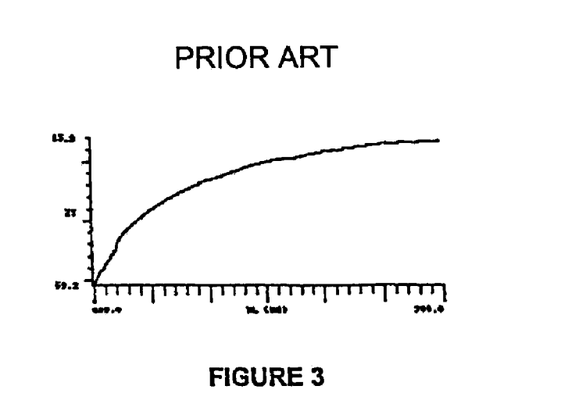
FIG. 3 is a graph depicting the transmittance spectrum of a known polyethylene plant protective cover, without any transmission spectrum modifiers, used in the horticultural industry.
Figure 4:
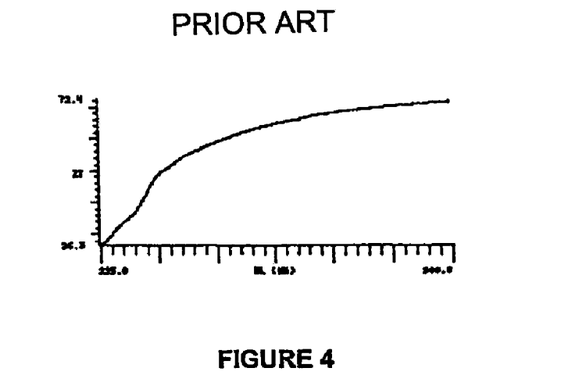
FIG. 4 is a graph depicting the transmittance spectrum of another known polyethylene plant protective cover, without any transmission spectrum modifiers, produced from radiation pre-cross-linked linear low density polyethylene.

Shown in FIG. 3 is a graph depicting the transmittance spectrum of a standard prior art polyethylene plant protective cover. The graph in FIG. 4 depicts the light transmission spectrum of a polyethylene plant protective film, which was manufactured employing a radiation pre-cross linked feedstock linear low-density polyethylene. The plant protective covers shown in FIG. 3 and FIG. 4 do not include any transmission spectrum modifiers. It follows from the graphs, that these covers have light transmittance spectra that are almost identical to that of similar prior art polyethylene plant protective covers.

Figure 5:
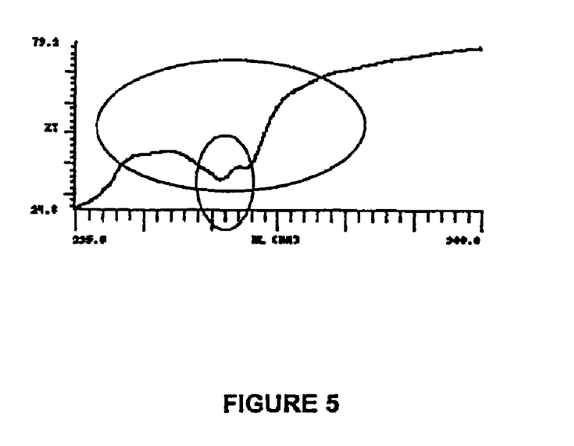
FIG. 5 is a graph depicting a transmittance spectrum indicating a reduced amount of transmittance of green and yellow wavelengths and a change in the ratio of transmittance of the blue to red wavelengths, by the inclusion of transmission spectrum modifiers in the plant protective cover in accordance with a first embodiment of the invention.

FIG. 5 shows the transmission spectrum of the cover according to a first embodiment of the invention, and which is modified in the photosynthetic active region according to the general photosynthetic and photomorphogenic requirements of plants to be cultivated underneath the cover. From the graph in FIG. 5, it is evident that it is possible to reduce the amount of transmittance of light of green and yellow wavelengths as well as to change the ratio of blue to red wavelengths by the inclusion of suitable spectrum modifying agents in the plant protective cover. For this film, no UV and IR spectrum modifiers were included.

Example 2

A plant protective cover according to a second embodiment of the invention, in the form of a photo-selective film was prepared as set out below. In table 1, the composition of the film, including pre-selected additives, is depicted:

|   | Additive Type | Chemical Name/Description | Concentration in Film (%) |
|---|---|---|---|
| 1 | Benzotriazole UV absorber | 2-(2-hydroxy-3-sec-butyl-5-t-butylphenyl)benzotriazole | 0.7 |
| 2 | Hindered amine light stabiliser | Dimethyl succinate .w/4-hydroxy-2,2,6,6-tetramethyl-1piperidine ethanol | 0.3 |
| 3 | Hindered amine light stabiliser | Poly((6-((1,1,3,3-tetramethylbutyl) amino)-s-triazine-2,4dijil)(2,2,6.6-tetramethyl-4-piperidyl)imino) hexamethylene(2,2,6,6-tetramethyl-4-piperidyl)imino))) | 0.3 |
| 4 | Phosphite antioxidant | Tris(2,4-di-t-butylphenyl)phosphite | 0.4 |
| 5 | Phenolic antioxidant | 1,3,5-trimethyl-2,4,6-tris(3,5-ditert-butyl-4-hydroxybenzyl)benzene | 0.2 |
| 6 | Hindered phenolic antioxidant | Tetrakismethylene(3,5-di-t-butyl-4-hydroxyhydrocinnamate)methane | 0.2 |
| 7 | Spectrum modifier | Chromophtal red BRN | 0.1 |
| 8 | Calcined clay IR absorber | Calcium carbonate (52%), magnesium carbonate (42%), silica (5%) and aluminium hydroxide | 2.0 |
| 9 | Radiation-modified LLDPE | Radiation pre-crosslinked linear low-density polyethylene with a MFI = 0.40 to 0.50 | 79.0 |

A film with a thickness of 180 μm was made through a process of extrusion film blowing employing a single screw extruder for the manufacture of a mono-layer film.

The extrusion conditions included:
a temperature profile where the extruder is at 190° C.;
a die temperature of 190° C.;
a die gap of 3.0 to 3.2 mm; and
a blow-up ratio ranging from 2.4 to 2.5.

Figure 6:
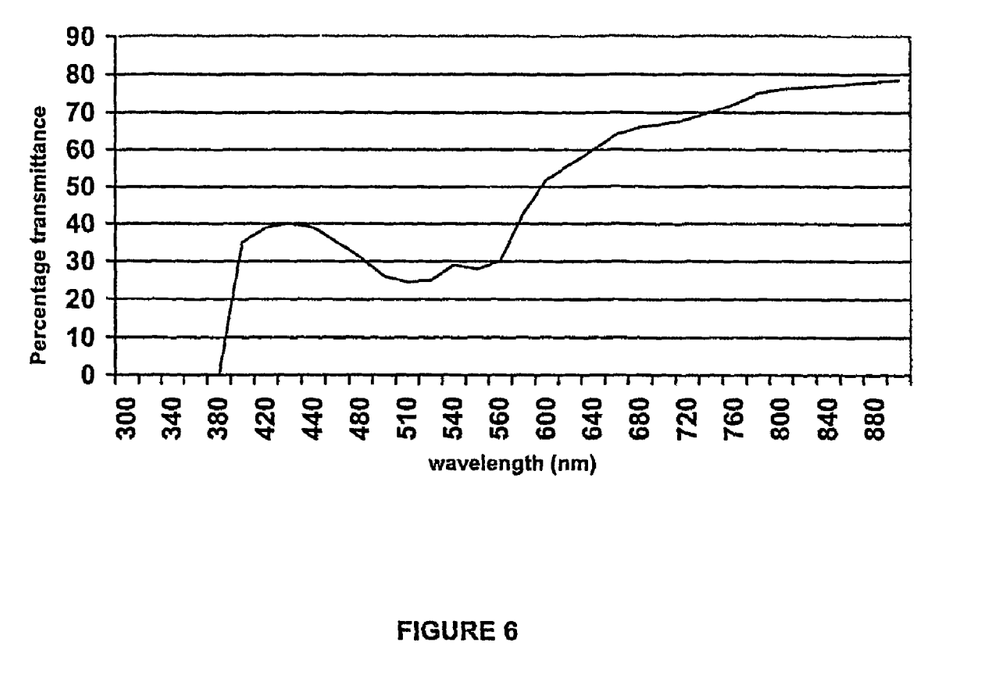
FIG. 6 is a graph depicting a transmittance spectrum indicating a reduced amount of transmitted green and yellow wavelengths and a change in the ratio of transmitted blue to red wavelengths, by the inclusion of transmission spectrum modifiers in the plant protective cover in accordance with a second embodiment of the invention, inclusive of both UV and IR spectrum modifiers.

The transmission spectrum of the plant protective cover manufactured in according to the example shown in Table 1 is presented in FIG. 6. It will be noticed that the transmittance spectrum is similar to the theoretical optimal transmittance spectrum that was postulated by the applicant.

The applicant has found that the plant protective cover in accordance with the second embodiment of the invention, having a selected optimal transmission spectrum (such as that of FIG. 6) results in a cover that enhances plant growth and decreases plant stress, whilst inhibiting insect activity underneath the cover. This is achieved by maximising the light transmittance of the plant protective cover in the red and far-red wavelengths (see 5 in FIG. 2), eliminating the ultraviolet region (see 1 in FIG. 2), decreasing the transmitted green and yellow wavelengths, as well as changing the ratio of blue to red wavelengths transmitted to a 2:3 ratio (see 2 and 3 in FIG. 2).

Vegetative growth is optimised and plant quality enhanced by allowing the highest possible amount of red and far-red wavelengths to be transmitted (see 1 and 3 in FIG. 2). Cooling costs are also reduced by minimising the infrared transmittance through the cover (see 4 in FIG. 2). The applicant has further found that in addition to the light transmittance characteristics, the plant protective cover of the invention has excellent mechanical properties, as well as a particularly high environmental stress cracking resistance owing to the polymer selection and pre-crosslinking thereof. The plant protective cover of the invention thus has both enhanced photosynthetic and excellent inherent film characteristics. It will be appreciated that these are features that positively impact on the economic potential of a plant protective cover according to the present invention.

The applicant has also found that the plant protective cover greatly enhances the production and quality of plants cultivated underneath the cover as a more favourable growing environment for plants cultivated underneath the cover is established. Furthermore, the invention enables a grower of plants to customise the cover in accordance with the particular variety of plant cultivated underneath the cover. This is done by preparing a profile of the optimal photosynthetic and photomorphogenic requirements of a particular variety of plant to be cultivated underneath the plant protective cover and adjusting the transmittance characteristics of the cover to match the requirements of the plant, within the parameters of the present cover. The adjustment of the transmittance characteristics of the cover is achieved by varying the amounts of additives depicted in Table 1 relative to each other.

Example 3

Materials and Methods

Study Area

A study was conducted in the Northern Province of South Africa, in the Nylstroom—Warmbaths area using the cover in accordance with the second embodiment of the present invention. The testing site was situated on the 24°27'30" Southerly latitude and the 28°8'30" Easterly longitude. The growth medium (soil) was 4-6 m deep and had a sandy-loam texture consisting of 84% sand, 4% silt and 12% clay, had a soil density of 1213 kg m$^{-3}$ and pore space of 447 dm m$^{-3}$. These soils have a field water capacity of 180 L m$^3$ of which 120 L m$^{-3}$ is plant available (MVSA, 1997).

Plant Material Used

Rose plants (*Rosa hybrida*, cv. Grand Gala; a vigorously growing, red, long stemmed, thornless rose) were used in this study. This variety of rose has a straight and erect growth form. The roses were two years old and fully productive when the study initiated. The 'Grand Gala' rose is classified as follows:

| | |
|---|---|
| Variety: | Meiqualis |
| Type: | Hybrid Tea |
| Colour: | Strawberry Red (FIG. 1) |
| Bud: | Conical (FIG. 1) |
| Number of Petals: | 30 on Average |
| Vase Life: | 10-12 days |
| Foliage: | Dark Green, Glossy |
| Stock: | Indica |
| Yield: | 130-160 blooms m$^{-2}$ year |
| Length of the Stems: | 60-80 cm |

Horticultural Practices

In this study, the rose plants had two or more basal shoots and were multiple-stemmed. The stems were harvested continuously, a method known as staggering (stagger harvesting), throughout the study period. The developmental stage at harvesting varies with cultivar, season and distance to the market, but generally the stems are harvested at the tightest stage at which the flower will open in neat water. In general the stems of yellow cultivars are harvested with the flower bud tighter than the pink cultivars, which is again harvested tighter than the flower buds of red cultivars. In the instances where the stems were harvested with the flower buds too tight, the flower will not open. Most stems of the pink cultivars and especially the red cultivars, must be harvested when at least one of the outer petals has started to unfold (Meyer et al, 1988, Pellett et al, 1998). Since 'Grand Gala' is a red cultivar the stems were harvested at the latter stage. The stems were harvested three times per day (6:00, 12:00 and 17:00). Whenever possible, stems were harvested in the early morning or late afternoon to prevent dehydration of the stems. High temperatures, sometimes necessitated the harvesting of the stems more than the preferable two times a day, since these climatic conditions influenced the water content and subsequently the fresh weight of the stems and lead to a decrease in quality, owing to flower buds opening too wide, decreasing vase life (Meyer et al, 1988). The stems were harvested with the highest possible length. In general, the stems were cut above the second five-pinnated compound leaf above the previous cut, slightly above the node. Thinner stems were cut closer to the previous cut or even below it.

The bent stem technique was used during this study. In short, this technique entails the bending down of lateral stems to increase the number of leaves (foliage) available for the process of photosynthesis. These lateral stems that are bent down are stems of poor quality: thin and short stems with small or deformed buds. By using this technique, the aisles are filled with foliage and are not very easily distinguishable from the beds itself, giving an overall bushy appearance.

The exceptionally long stems of this particular cultivar (Grand Gala) were kept in an upright position while they were growing. They were supported by wire fastened to the wooden poles planted ±12 meters apart at either side of each bed. The wire was fastened at a height of 45 cm and again at a height of 90 cm from the soil surface. The stems (shoots) were guided periodically to an upright position. This practice reduces the breaking and bending of the long stem roses and thus retaining the quality of the stems. Suckers, originating from the rootstock, also called the understock, were removed and secondary buds were pinched of, leaving only the terminal bud to fully develop into a flower. The blind shoots were removed in an early stage of shoot development, since allowing the development of non-marketable stems is too wasteful from a plant energy utilisation perspective. Stems with bent necks were harvested and sold as low-grade stems. Stems originating from the basal shoots, also referred to as 'water shoots' or 'renewal canes', were also harvested for the local market. The beds and aisles of the greenhouse were kept free of weeds, fallen leaves, petals and twigs, minimising the occurrence and spreading of diseases. The dead and sick parts of the rose bushes were also removed for the same reason.

Greenhouse Description

Data collection during this study occurred in a commercially productive greenhouse. The greenhouse had a length of 100 m, a width of 50 m and a height of 5 m, covering a surface area of 5000 m$^2$ or ½ a hectare. The beds of the greenhouse (72 beds in total) were 47 m long and 1 m wide and raised to a height of 0.40 m, with aisles of 0.40 m in between. Each bed consisted of two rows of roses with a total of 556 rose plants per bed. There were a total number of 40000 rose plants in the greenhouse (8 plants.m$^{-2}$ of the greenhouse).

The control part of the greenhouse was covered with a 200 micron, UV protected polyethylene film (Triclear). The growth medium was the soil of the setting itself of a sandy-loam texture. The experimental part of the greenhouse was covered with the cover of the second embodiment of the invention as described above. Three roof strips of the green house were replaced with the cover of the invention, with measurements being taken only at the central portion, to minimise the impact of unmodified light from the sides.

Irrigation

A drip irrigation system was used to apply water and fertilise the plants simultaneously; a process called fertigation. The fertigation system was completely automated: the timing and amount of irrigation water and fertiliser applied and the EC (electrical conductivity—amount of ions in solution) were thus continually monitored and kept constant. It had the advantage that the water and fertiliser were applied in specific quantities directly to the root zone of the plants. The EC differed between the summer and winter periods; in summer it was set between 1.3 and 1.4 mS cm$^{-1}$ while in winter it was set between 1.6 and 1.7 mS cm$^{-1}$. More irrigation cycles were applied in summer than in winter. The water pH (water and fertiliser) was kept constant at 6.5.

The irrigation pipes were 2.5 cm wide plastic pipes with perforations (called drippers in this experiment) 30 cm apart, with no nozzles attached to it. Each bed had one irrigation pipe, running in the middle of the bed and the whole length of the bed. Each of the irrigation pipes had an irrigation capacity of 1 liter dripper$^{-1}$ hour$^{-1}$ except one of the side beds, which had an irrigation capacity of ½ a liter dripper$^{-1}$ hour$^{-1}$ owing to the capacity of its distributors. The volume of water applied to the plants was kept at 1.2 l plant$^{-1}$ day$^{-1}$ since it was close to the maximum transpiration rate of a rose plant, being 1.5 l m$^{-2}$ day$^{-1}$ (in the summer).

Cooling and Ventilation

Natural air movement was used to cool and ventilate the interior of the greenhouse. The ventilation system comprised of six roof flaps that ran parallel with the length of the greenhouse and opened in a westerly direction. The ventilation system was computerised using temperature, humidity and wind speed as the determining factors for the aperture size of the roof flaps. Although the greenhouse had adjustable sidewalls, they were never opened for ventilation and cooling. The cooling and ventilation system was not effective in lowering the air temperature of the greenhouse interior.

Environmental Variables

Environmental variables were measured at 7 h 00, 12 h 00 and 15 h 30 and are representative of the environmental conditions in the morning, noon and afternoon respectively. Natural Irradiation was the only form of irradiation the rose plants received. No supplementary lighting was given during the day or night periods. Photosynthetic photon flux density (PPFD; $\mu mol\ m^{-2}\ s^{-1}$), the $CO_2$ concentration ($[CO_2]$) in the interior of the greenhouse, and the air temperature (T) were measured by using an infrared gas analyser (IRGA). The percentage relative humidity (RH %) and the vapour pressure deficit (VPD) were calculated using the transpirational- and temperature data and assuming that the air inside the stomatal cavities was saturated (RH %=100%). The total daily PPFD ($mol\ m^{-2}\ day^{-1}$) was calculated while the day length as well as the irradiation hours were obtained from the South African Weather Bureau.

Results

Irradiation levels (PPFD), air temperature and $[CO_2]$ measured at 7 h 00, 12 h 00 and 15 h 30 as well as the calculated RH % and VPD are presented in Table 2. PPFD measured at 12 h 00 and 15 h 30 is much higher than that in other studies e.g. 50-150 $\mu mol\ m^{-2}\ s^{-1}$ (Blom-Zandstra et al., 1995) and 100-1200 $\mu mol\ m^{-2}\ s^{-1}$ (Jiao et al., 1991). The average temperatures during the day (18-28° C.) corresponds to the air temperature reported in previous studies (Hopper and Hammer, 1991; Mor and Halevy, 1984). $[CO_2]$ at 12 h 00 and 15 h 30 were in the range of the atmospheric $[CO_2]$ of 350 $\mu mol\ mol^{-1}$ (Jiao et al., 1991; Taiz and Zeiger, 1991), while those at 7 h 00 were higher. This might probably be due to the closed roof vents, the nightly respiration of the plants and the minimal photosynthesis rate. The average % RH values determined for the 7 h 00, 12 h 00 and 15 h 30 data were all much lower than the recommended value of 65% determined by Mortensen and Fjeld (1998) and 75% by Mortensen and Gislerød (1999). Except for 7 h 00 (0.84±0.25 kPa), the VPD for 12 h 00 (2.03±1.10 kPa) and 15 h 30 (2.26±0.74 kPa) were, however, much higher than the recommended 0.82 kPa determined by Mortensen and Fjeld (1998) and 0.55 kPa determined by Mortensen and Gislerød (1999). These values are, however, much lower in comparison with the maximum value of 4.6 kPa determined by Katsoulas et al. (2001). The average daily irradiation time was >9 hours and the daily PPFD ranged from 43-60 $mol\ m^{-2}\ day^{-1}$ and the latter compares well with the values for a monthly average in summer at medium latitudes viz. 30-60 $mol\ m^{-2}\ day^{-1}$ (Salisbury & Ross, 1992).

TABLE 2

The average (±s.d.) PPFD, temperature, $[CO_2]$, RH % and VPD at different times of the day over the study period.

| Environmental variables | 7:00 | 12:00 | 15:30 |
| --- | --- | --- | --- |
| PPFD ($\mu mol\ m^{-2}\ s^{-1}$) | 206.93 ± 157.26 | 1671.62 ± 387.46 | 925.32 ± 385.81 |
| Temp (° C.) | 17.94 ± 4.23 | 28.92 ± 4.52 | 27.82 ± 4.51 |
| $[CO_2]$ ($\mu mol\ mol^{-1}$) | 485.30 ± 59.20 | 346.24 ± 15.84 | 358.83 ± 14.37 |
| RH (%) | 56.67 ± 7.42 | 40.71 ± 27.22 | 28.93 ± 13.46 |
| VPD (kPa) | 0.84 ± 0.25 | 2.03 ± 1.10 | 2.26 ± 0.74 |

From the results presented in Table 3, it is evident that over the three week monitoring period the quality criteria typically used to evaluate the quality of product formed increased significantly.

TABLE 3

Indicating the percentage difference induced to the quality criteria of roses (var. Grand Gala) over a three week period by the use of the photo-selective cover.

| | Control | Experimental cover | % Difference |
| --- | --- | --- | --- |
| Week 1 | | | |
| Bud size (cm) | 5.03 | 5.03 | 0 |
| Bud diameter (cm) | 3.5 | 3.58 | 2.3 |
| Stem length (cm) | 82.2 | 87.5 | 6.4 |
| Stem diameter (cm) | 8.2 | 8.35 | 1.8 |
| Weight (g) | 76 | 80 | 5.3 |
| Week 2 | | | |
| Bud size (cm) | 4.96 | 5.06 | 2 |
| Bud diameter (cm) | 3.45 | 3.5 | 1.4 |
| Stem length (cm) | 88.5 | 89.7 | 1.4 |
| Stem diameter (cm) | 6.1 | 8.8 | 44.3 |
| Weight (g) | 68 | 83 | 22.1 |
| Week 3 | | | |
| Bud size (cm) | 5.01 | 5.3 | 5.7 |
| Bud diameter (cm) | 3.5 | 3.58 | 2.3 |
| Stem length (cm) | 86 | 88.3 | 2.7 |
| Stem diameter (cm) | 7.6 | 8.5 | 11.8 |
| Weight (g) | 78 | 81 | 3.8 |

In summary, it was found that over the monitored three week period on average the bud size, bud diameter, stem length stem diameter and total stem weight was increased by 0.86, 2.0, 3.5, 19.3 and 10.4%, respectively. What makes these findings even more dramatic is the fact that it should be realised that roses comprise a tree-type growth form that responds relatively slowly to environmental change due to its inherent buffering capacity, implying that these results could be even more dramatic over the long term and with other types of plants.

Example 4

In comparative studies, conducted with a view to evaluate the potential growth promoting and stress minimising properties of the plant protective cover of the present invention, for a number of different crops, dramatic positive effects on plant growth have been noted for cucumbers, tomatoes, seedlings and pot plants. For example, cucumbers of exactly the same cultivar, growth form, and planted on the same day were compared with cucumbers cultivated under the cover. When the cucumbers of the plants cultivated under the cover were ready to be harvested (i.e. mother plants were two meters long) the comparative plants cultivated under the conventional prior art cover had only reached a height of 1.2 meters and the fruits were only 10 cm long.

Seedlings and potted plants cultivated under the cover also showed substantial growth stimulated responses, in that both had superior foliage colour development (greening due to increased chlorophyl production) and the seedlings showed substantial increased root development. Furthermore, whilst the potted plants cultivated under the cover flowered five days later, the plants were vegetatively superior and had a relatively better colour development.

It will be appreciated that the cover is not limited to any particular form, but could be produced in a form selected from the group consisting of inter alia a mono film, a multi-layer laminate film, a rigid sheet, and a woven or knitted net.

It will be appreciated further that variations in detail are possible with a plant protective cover, a method of manufacturing a plant protective cover, plants cultivated using the plant protective cover and a method of cultivating plants using such plant protective cover according to the invention without departing from the scope of the appended claims.

REFERENCES

1. Blom-Zandstra, M., Pot, C. S., Maas, F. M. & Schapendonk, A. H. C. M. 1995. Effects of different light treatments on the nocturnal transpiration and dynamics of stomatal closure of two rose cultivars. *Scientia hoiticulturae*, 61:251-262.
2. Hopper, D. A., 1996. High-pressure sodium radiation during off-peak nighttimes increases cut rose production and quality. Hortsience. 31, 938-940.
3. Hopper, D. A. & Hammer, P. A. 1991. Regression models describing *Rosa hybrida* response to day/night temperature and photosynthetic photon flux. *Journal of the American society for horticultural science*, 116:609-617.
4. Jiao, J., Tsujita, M. J. & Grodzinski, B. 1991. Influence of temperature on net $CO_2$ exchange in roses. *Canadian journal of plant science*, 71:235-243.
5. Katsoulas, N., Baille, A. & Kittas, C. 2001. Effects of misting on transpiration and conductances of a greenhouse rose canopy. *Agricultural and forest meteorology*, 106: 233-247.
6. Meyer, L., Coertze, A. F., Van der Laarse, G., 1988. Die verbouing van rose vir snyblomproduksie: Deel 2. Rhoodeplaat Bulletin, 17, 12-13. (In Afrikaans).
7. Misstofvereniging van Suid Afrika (MVSA). 1997. Bemesting Handleiding. Vierde Hersiene Uitgawe, FSSA-MVSA.
8. Mor, Y. & Halevy, A. H. 1984. Dual effect of light on flowering and sprouting of rose shoots. *Physiologia plantarum*, 61:119-124.
9. Mortensen, L. M. & Field, T. 1998. Effects of air humidity, lighting period and lamp type on growth and vase life of roses. *Scientia horticulturae*, 73:229-237.
10. Mortensen, L. M. & Gislerød, H. R. 1999. Influence of air humidity and lighting period on growth, vase life and water relations of 14 rose cultivars. *Scientia horticulturae*, 82:289-298.
11. Moss, G. I., 1984. The effects of root-zone warming on the yield and quality of roses grown in a hydroponic system. J. Hort. Sci. 59, 549-558.
12. Pellet, G., Ferguson, R., Zary, K., 1998. Rosa (rose). In: Ball, V. (Ed.), Ball RedBook. 16th ed. Batavia, Ill., Ball Publishing, pp. 705-726.
13. Salisbury. F. B. & Ross. C. W. 1992. Plant physiology. 4th ed. Belmont, Calif.: Wadsworth. 682 p.
14. Taiz, L. & Zeiger, E. 1991. Plant physiology. California: Benjamin/Cummings. 565 p.

The invention claimed is:

1. A plant protective cover comprising
a translucent polymeric material,
a first transmission spectrum modifier in the material for minimizing the transmission in the ultraviolet range up to 350 nm, and
a second transmission spectrum modifier in the material in the form of chromophtal red BRN to adjust the transmission in the visible light range between 350 nm and 750 nm of natural light irradiation passing through the cover, in accordance with photosynthetic and photomorphogenic requirements of plants to be cultivated underneath the plant protective cover, to enhance the growth conditions of such plants, by decreasing the transmitted green and yellow wavelengths and by changing the ratio of blue to red wavelengths transmitted to a 2:3 ratio, so as to increase the level of transmission of the red wavelength relative to the level of transmission thereof in the absence of the second transmission spectrum modifier.

2. A plant protective cover according to claim 1, wherein the material includes between 0.05 and 2.0% on a mass per mass basis of the transmission spectrum modifier in the form of chromophtal red BRN.

3. A plant protective cover as claimed in claim 1 or 2, which includes in the material at least one substance selected from the group consisting of between 0.1 and 2.0% of a phosphite antioxidant on a mass per mass basis, between 0.1 and 2.0% of a hindered phenolic antioxidant and a pre-irradiated linear low-density polyethylene.

4. A plant protective cover as claimed in claim 3, wherein the material of the plant protective cover includes on a mass per mass basis any one or more additives selected from the group consisting of 2.0% of a calcined clay IR absorber, 0.3% of a first hindered amine light stabilizer in the form of dimethyl succinate .w/ 4-hydroxy-2,2,6,6-tetramethyl-1 piperidine ethanol, 0.3% of a second hindered amine light stabilizer in the form of poly((6-((1,1,3,3-tetramethylbutyl)amino)-s-triazine-2,4dijil)(2,2,6,6-tetramethyl-4-piperidyl)imino) hexamethylene(2,2,6,6-tetramethyl-4-piperidyl)imino))), 0.4% of a phosphite antioxidant in the form of tris(2,4-di-t-butylphenyl)phosphite, 0.2% of a phenolic antioxidant stabilizer in the form of 1,3,5-trimethyl-2,4,6-tris(3,5-ditert-butyl-4-hydroxybenzyl)benzene, 0.2% of a hindered phenolic antioxidant in the form of tetrakismethylene(3,5-di-t-butyl-4-hydroxyhydrocinnamate)methane and 2.0% of an IR absorber in the form of calcium carbonate (52%), magnesium carbonate (42%), silica (5%) and aluminium hydroxide.

5. A plant protective cover as claimed in claim 1 or 2, wherein the material of the plant protective cover includes up to 95% on a mass per mass basis of a radiation-pre-crosslinked linear low-density polyethylene having a melt flow index (MFI) of 2160 g/10 min at 190° C.

6. A plant protective cover as claimed in claim 1 or 2, wherein the cover is produced in a form selected from the group consisting of a mono film, a multi-layer laminate film, a woven net and a knitted net.

7. A plant protective cover as claimed in claim 6, wherein the cover is in the form of a woven net or a knitted net and the polymeric material is selected from the group consisting of fibrous polyethylenes, polyamides and polyesters.

8. A method of manufacturing a plant protective cover comprising the steps of:
providing a translucent polymeric material;
incorporating in the material a first transmission spectrum modifier for minimizing the transmission in the ultraviolet range up to 350 nm; and incorporating in the material a second transmission spectrum modifier in the form of chromophtal red BRN to adjust the transmission in the visible light range between 350 nm and 750 nm of natural light irradiation passing through the cover, in accordance with photosynthetic and photomorphogenic requirements of plants to be cultivated underneath the plant protective cover, to enhance the growth conditions of such plants, by decreasing the transmitted green and yellow wavelengths, and by changing the ratio of blue to red wavelengths transmitted to a 2:3 ratio, so as to increase the level of transmission of the red wavelength relative to the level of transmission thereof in the absence of the second transmission spectrum modifier.

9. A method as claimed in claim 8, wherein the step of incorporating in the material a second transmission spectrum modifier includes the step of incorporating in the material between 0.05 and 2.0% on a mass per mass basis of the spectrum modifier in the form of chromophtal red BRN.

10. A method as claimed in claim 8 or 9, including the step of including in the material at least one substance selected from the group consisting of between 0.1 and 2.0% of a phosphite antioxidant on a mass per mass basis, between 0.1 and 2.0% of a hindered phenolic antioxidant and a pre-irradiated linear low-density polyethylene.

11. A method as claimed in claim 10, including the step of including in the material, on a mass per mass, any one or more additives selected from the group consisting of 2.0% of a calcined clay IR absorber, 0.3% of a first hindered amine light stabilizer in the form of dimethyl succinate .w/ 4-hydroxy-2, 2,6,6-tetramethyl-1 piperidine ethanol, 0.3% of a second hindered amine light stabilizer in the form of poly((6-((1,1,3,3-tetramethylbutyl)amino)-s-triazine-2,4dijil)(2,2,6,6-tetramethyl-4-piperidyl)imino)hexamethylene(2,2,6,6-tetramethyl-4-piperidyl)imino))), 0.4% of a phosphite antioxidant in the form of tris(2,4-di-t-butylphenyl)phosphite, 0.2% of a phenolic antioxidant stabilizer in the form of 1,3,5-trimethyl-2,4,6-tris(3,5-ditert-butyl-4-hydroxybenzyl) benzene, 0.2% of a hindered phenolic antioxidant in the form of tetrakismethylene(3,5-di-t-butyl-4-hydroxyhydrocinnamate)methane, and 2.0% of an IR absorber in the form of calcium carbonate (52%), magnesium carbonate (42%), silica (5%) and aluminium hydroxide.

12. A method as claimed in claim 8, wherein the step of providing the translucent polymeric material includes the step of providing a material that includes up to 95% on a mass per mass basis of a radiation pre-irradiated linear low-density polyethylene having a melt flow index (MFI) of 2160 g/10 min at 190° C.

13. A method as claimed in claim 8, wherein the step of providing the translucent polymeric material includes the step of incorporating the transmission spectrum modifiers in one or more films extruded in a form selected from the group consisting of a mono film, a multi-layer laminate film, a woven net and a knitted net.

14. A method as claimed in claim 8, wherein the cover is in the form of a woven net or a knitted net, and the polymeric material is selected from the group consisting of fibrous polyethylenes, polyamides and polyesters.

* * * * *